United States Patent [19]

Kirk

[11] 4,433,583

[45] Feb. 28, 1984

[54] FLOW METER

[76] Inventor: William H. Kirk, 3112 Starr Rd., Royal Oak, Mich. 48073

[21] Appl. No.: 390,698

[22] Filed: Jun. 21, 1982

[51] Int. Cl.³ .............................................. G01F 1/06
[52] U.S. Cl. .............................. 73/861.33; 73/861.77
[58] Field of Search ........... 73/861.32, 861.33, 861.77, 73/861.79

[56] References Cited

U.S. PATENT DOCUMENTS 3,021,710  2/1960  Barrere et al. .................. 73/861.77
3,447,373  6/1969  McNabb ........................... 73/861.33
3,937,081  2/1976  Dabanian et al. ............... 73/861.33
4,282,883  8/1981  Yerushalmy ..................... 73/861.77

Primary Examiner—Herbert Goldstein
Attorney, Agent, or Firm—Hauke and Patalidis

[57] ABSTRACT

A flow meter, for measuring fluid flow rates, having a housing through which the fluid flows and is caused to impinge on an impeller or rotor for rotating the impeller at a rotational velocity representative of the fluid flow rate. The impeller or rotor has a plurality of teeth on which a light beam is reflected. A photosensitive device receiving the reflected chopped light produces at its output a signal whose frequency is a function of the rotational velocity of the impeller.

11 Claims, 7 Drawing Figures

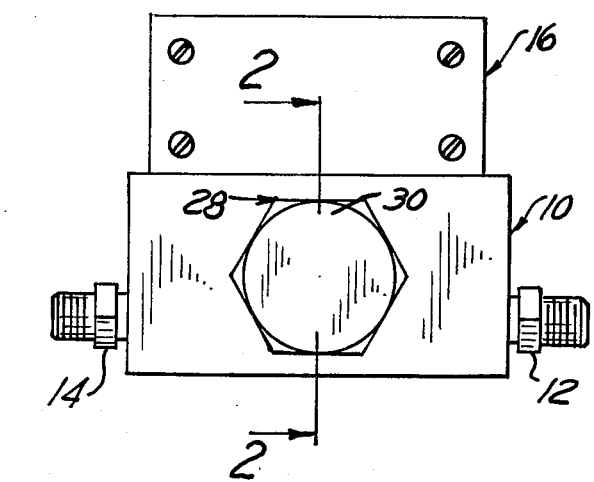
FIG. 1
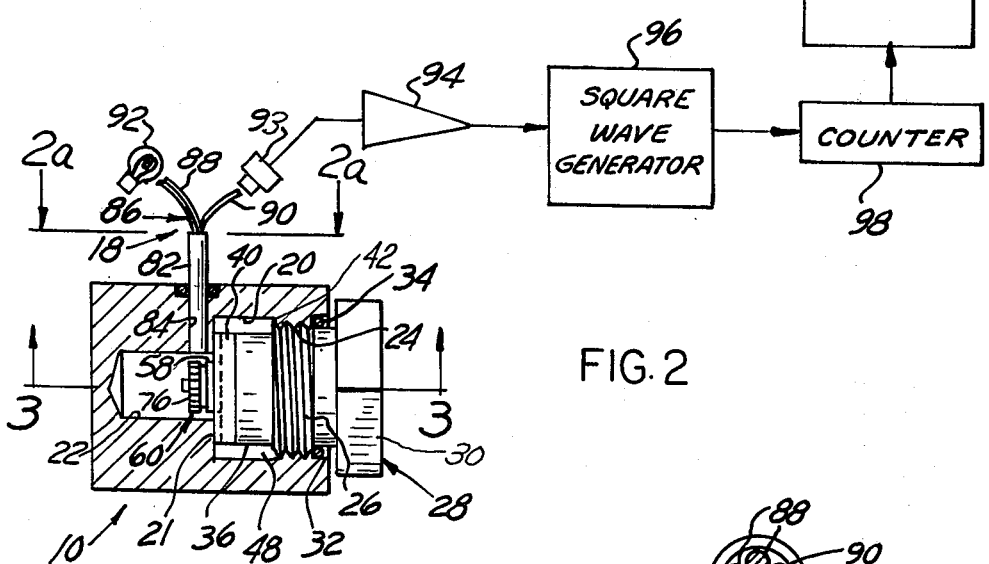
FIG. 2
FIG. 2a
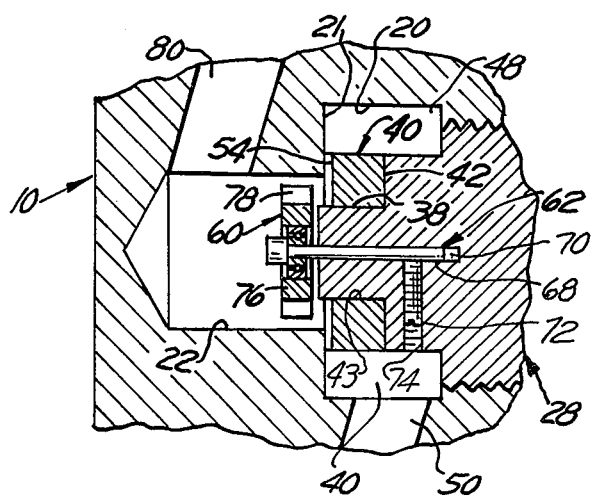
FIG. 6

FLOW METER

BACKGROUND OF THE INVENTION

The present invention relates to a flow meter for measuring the flow rate of a fluid such as a liquid fluid or a gaseous fluid, for example.

Known flow meters are subjected to any number of a plurality of disadvantages such as, for example, lack of accuracy except within a very narrow range of measured flow rates, high pressure losses, lack of linearity of the signal output, and unreliable indication of low flow rates, for example. In addition, most flow meters available on the market utilize a rotor provided with vanes or blades which are interposed in a light beam between a light source and a photosensitive device which measures the fluid flow rate as a function of the number of times the light beam is interrupted by the vanes or blades in a given time basis. Because the light beam travels a considerable distance within the fluid, it is subject to substantial absorption and dispersion while passed through liquid fluids lacking adequate light transmissivity.

SUMMARY OF THE INVENTION

The present invention provides a flow meter capable of providing a substantially linear signal output over a wide range of fluid flow rate, which utilizes a reflected interrupted or chopped light beam travelling through a very thin film of the fluid, and which is adaptable to a variety of flow rate ranges through substitution of a simple orifice plate providing a swirling flow of fluid impinging upon an impeller, preferably in the form of a smooth-rimmed wheel. A toothed wheel, which may be substituted for the smooth-rimmed wheel but which, preferably, is formed as a unit with the smooth-rimmed wheel, has a plurality of teeth on which a light beam channeled through optical fibers is directed and reflected, via a receiver optical fiber, to a light-sensitive detector.

The many objects and advantages of the present invention will become apparent to those skilled in the art when the following description of the best modes contemplated for practicing the invention is read in conjunction with the accompanying drawing wherein:

BRIEF DESCRIPTION OF THE DRAWING

FIG. 1 is an elevation view of a flow meter according to the present invention;

FIG. 2 is a section therethrough as seen from line 2—2 of FIG. 1, including a schematic representation of the optical system associated therewith;

FIG. 2a is a partial section from line 2a—2a of FIG. 2;

FIG. 6 is a partial view similar to FIG. 3 but showing a modification thereof.

DETAILED DESCRIPTION OF THE PREFERRED EMBODIMENTS

Figure 3:
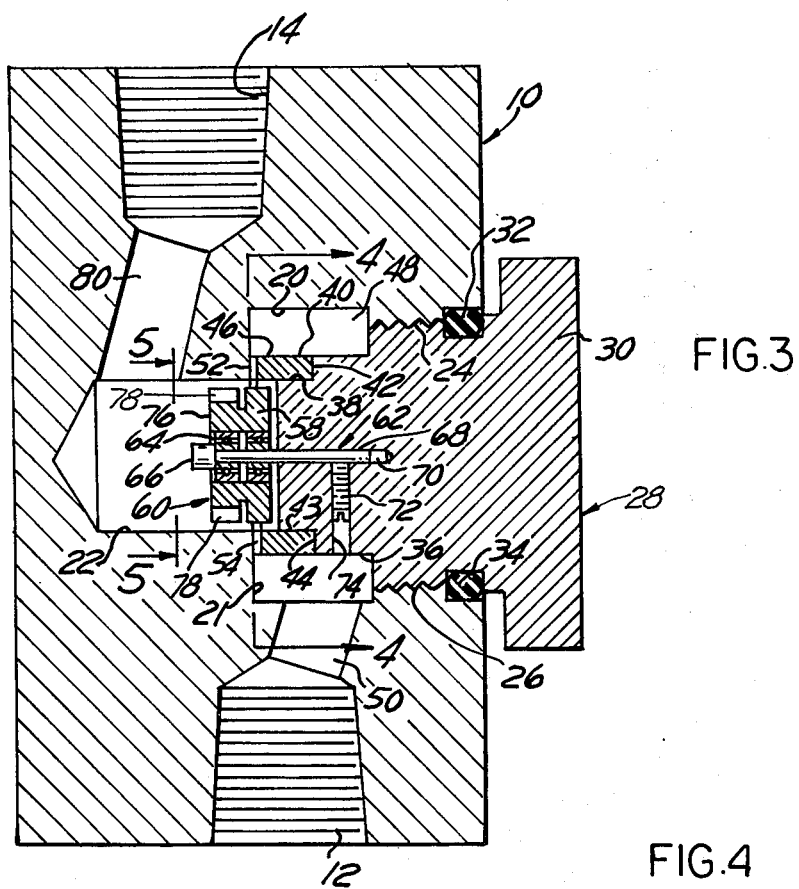
FIG. 3 is a section, at an enlarged scale, along line 3—3 of FIG. 2.

Referring to the drawing, and more particularly to FIG. 1, a flow meter according to the present invention comprises a body or housing 10 having an inlet for connection to a fluid inlet 12 and an outlet for connection to a fluid outlet 14. An enclosure 16 is mounted on a side of the body 10, and contains the optical system, shown schematically at 18, FIG. 2, associated with the flow meter for measuring flow rate through the body 10 from the inlet 12 to the outlet 14.

As further shown in more details at FIGS. 2 and 3, the body 10 has a longitudinal cylindrical bore 20 of relatively large diameter axially disposed with a longitudinal blind bore 22 of relatively smaller diameter, a step annular surface 21 being formed between the bores 20 and 22. The bore 20 has an open end provided with a thread 24 accepting the peripherally threaded portion 26 of a plug 28 provided with, for example, an hexagonal head 30. The plug 28 has a peripheral annular groove 32 disposed proximate its hexagonal head 30 in which is placed an elastomeric O-ring 34 providing an effective seal against leakage of fluid from the inside of the bore 20. The other end of the plug 28 has a cylindrical reduced diameter peripheral surface 36 terminating into a further reduced diameter portion 38, FIG. 3, supporting an annular orifice plate 40. The orifice plate 40 has an annular end face 42 engaged with the annular step surface 44 between the plug large diameter cylindrical surface 36 and the plug reduced diameter cylindrical end portion 38, around which is installed the annular orifice plate 40, the plug reduced diameter end portion 38 fitting in the cylindrical opening 43 of the annular orifice plate 40. Preferably, the peripheral surface 46 of the orifice plate 40 is flush with the peripheral cylindrical surface 36 of the plug 28 such as to form, with the surface of the bore 20 an annular chamber 48 in fluid communication with the inlet 12 through a channel 50.

Figure 4:
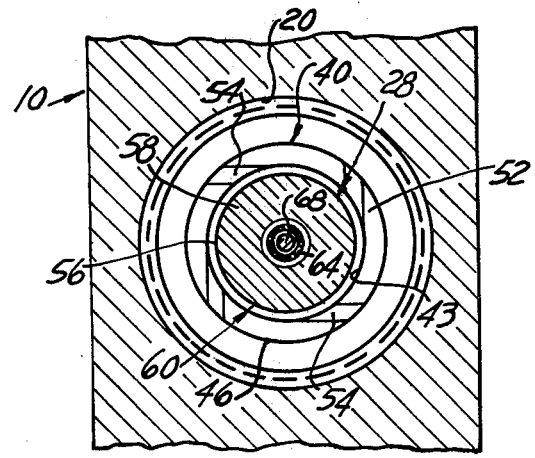
FIG. 4 is a partial section from line 4—4 of FIG. 3.

The annular orifice plate 40 has a face 52 provided with one or more tangential grooves 54, four of which are shown at FIG. 4. The face 52 is engaged with the annular surface 21 between the body large diameter bore 20 and the small diameter bore 22 when the plug 28 is installed within the bore 20, thus maintaining the annular orifice plate 40 solidly in position and causing the fluid flowing from the annular chamber 48 into the bore 22 to flow in a swirling motion into the open portion of the orifice plate cylindrical opening 43 such as to tangentially impact upon the smooth cylindrical surface 56 of the wheel portion 58 of an impeller or rotor 60, thus causing the rotor 60 to rotate at a velocity representing the flow velocity through the tangential nozzles formed by the grooves 54 and the portions of the annular surface 21 closing the top of the grooves 54. The rotor 60 is supported from a stationary hub, FIG. 5, in the form of a pin 62, by bearing means such as ball bearings 64, the pin 62 having a retainer end portion 66 engaging the inner race of the ball bearings 64, on the end of a slender body portion 68 fitted in an axially disposed bore 70 in the plug 28. FIGS. 3 and 6, a radially disposed set screw 72 threading in a radial bore 74 holding the body portion 68 of the pin 62 securely in position.

Figure 5:
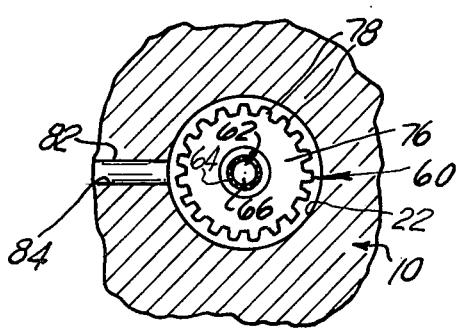
FIG. 5 is a partial section from line 5—5 of FIG. 3.

The rotor 60 comprises a toothed wheel 76, as shown at FIGS. 3 and 5, formed integral with or attached to the smooth-rimmed wheel 58 and provided with a plurality of peripheral teeth 78, which is rotated in unison with the smooth-rimmed wheel 58. The fluid flowing from the annular chamber 48, through the nozzles formed by the grooves 54 tangential to the periphery of the smooth-rimmed wheel 58, and causing the rotor 60 to rotate, flows into the bore 22 to the outlet 14 via a channelway 80.

A light tube 82, FIGS. 2 and 5, is disposed within a radial bore 84 through the flow meter body or housing 10 in alignment with the toothed wheel 76. The light tube 82 carries a bundle 86 of optical fibers, FIGS. 2 and 2a, for example seven in number. Six optical fibers 88 are peripherally disposed in the light tube 82 relative to a single centrally disposed fiber 90, for example, and the peripheral fibers 88 form a secondary bundle where they emerge from the light tube 88 and directed with an end proximate to a light source, such as light bulb 92. The bundle of optical fibers 88 transmits light from the light bulb 92 to the end of the light tube 82 disposed proximate the periphery of the toothed wheel 76. The center optical fiber 90 transmits the interrupted or chopped light reflected from the teeth 78 of the toothed wheel 76 to a photosensitive device 93, such as a photovoltaic or photoresistive photocell. The signal at the output of the photocell 93 is fed to a utilization circuit, FIG. 2, forming no part of the present invention, through, for example, an appropriate signal amplifier 94, a square wave generator 96 transforming the signal into square wave pulses for counting the number of pulses within a predetermined time basis in a counter 98, and for eventual numerical display in a display device 100 indicating the fluid flow rate through the flow meter, or for any other appropriate utilization, such as controlling a flow valve or the like.

The number of teeth 78 of the toothed wheel 76 of the rotor 60 may be arbitrarily chosen according to the desired flow rate definition and degree of accuracy for low flow rates. It has been found experimentally that twelve teeth are sufficient to cover considerable flow rate ranges. With the structure according to the invention, a curve representing flow rate as a function of, for example, pulses per second at the output of the photodetector 93, is substantially linear and accurate for flow rate range ratios as high as 20 to 1. The useful flow rate range can be easily changed and the flow meter of the invention adapted to any fluid flow rate range merely by substituting the annular orifice plate 40 by another. Orifice plates 40 may be provided with any number of grooves 54, from one groove and, preferably two, to three, four or more grooves to accommodate diverse ranges of flow rate within several orders of magnitude. The width and the depth of the grooves 54 may also be varied from one orifice plate 40 to another, such that by simply inserting the appropriate orifice annular plate 40 for a predetermined range of flow rates on the end of the plug 28, the flow meter of the invention may be tailored, without any modification of elements, to accommodate a plurality of flow rate ranges and measures such flow rates within a range with high accuracy.

As illustrated at FIG. 6, the rotor 60 may consist simply of the toothed wheel 76, rotatably mounted on the end of the plug 28 within the reduced diameter bore 22 in the body 10, such that the toothed wheel 76 is disposed within the reduced diameter bore 22 relatively proximate the outlet of the grooves 54 in the aperture plate 40, thereby in the swirling flow of fluid, with the teeth 78 optically aligned with the optical axis of the light tube 82.

It will be appreciated that only a very thin film of the fluid circulating through the flow meter of the invention is interposed between the end of the optical fibers 88 and 90 in the light tube 82 and the peripheral surface of the toothed wheel 76, with the result that the direct light beam and the reflected light beam need not travel through a substantial thickness of fluid, as is the case in flow meters utilizing a light beam traversing a considerable thickness of fluid from a light emitting device to a photosensitive device, and wherein the light beam is interrupted by vanes or teeth disposed on the periphery of a rotor. Because of the short distance travelled by the light within the fluid, the flow meter of the invention is capable of accurately measuring flow rates of relatively opaque fluids. The light may be visible light or it may be infrared radiation.

Having thus disclosed the present invention by way of examples of structural embodiments thereof well designed to achieve the objectives of the invention, modifications whereof will be apparent to those skilled in the art, what is claimed as new is as follows:

I claim:

1. A flow meter comprising a body, a first chamber in said body, a fluid inlet in communication with said first chamber, a second chamber in said body, a fluid outlet in communication with said second chamber, a rotor member disposed in said second chamber, at least one orifice for flowing fluid from said first chamber into said second chamber, said orifice being a channel having an inlet in said first chamber and an outlet in said second chamber, said channel being arranged to provide a swirling motion to the fluid flow from said first chamber to said second chamber, said rotor being disposed such as to be acted upon by the fluid in swirling motion for causing said rotor to rotate at a velocity proportional to the fluid flow rate through said orifice, a toothed wheel formed integrally with said rotor, a light source, means for projecting a light beam from said light source upon the periphery of said toothed wheel whereby said light beam is periodically reflected from said toothed wheel, a photosensitive element and means for transmitting said periodically reflected light beam to said photosensitive element, said photosensitive element providing at its output a signal of a frequency proportional to the velocity of rotation of said toothed wheel.

2. The flow meter of claim 1 wherein said first chamber is annular.

3. The flow meter of claim 2 wherein said annular chamber is formed between a cylindrical bore surface in said body and a cylindrical peripheral surface on a plug member disposed in said first chamber, said rotor being mounted on the end of said plug.

4. The flow meter of claim 3 wherein said means for transmitting said light from said light source and for transmitting said periodically reflected light to said photosensitive element are optical fibers.

5. The flow meter of claim 3 wherein said first chamber and said second chamber are substantially coaxial, said first chamber is of larger diameter than said second chamber, and an annular abutment is formed between said first chamber and said second chamber, and wherein said orifice is in an annular plate removably mounted on the end of said plug and said channel is in the form of a groove formed in a face of said annular plate in engagement with said annular surface.

6. The flow meter of claim 5 wherein said rotor comprises a smooth-rimmed wheel having a peripheral portion disposed in a circular recess in said annular plate.

7. The flow meter of claim 6 wherein said means for transmitting said light from said light source and for transmitting said periodically reflected light to said photosensitive element are optical fibers.

8. The flow meter of claim 5 wherein said means for transmitting said light from said light source and for transmitting said periodically reflected light to said photosensitive element are optical fibers.

9. The flow meter of claim 1 wherein said means for transmitting said light from said light source and for transmitting said periodically reflected light to said photosensitive element are optical fibers.

10. The flow meter of claim 9 wherein said optical fibers are disposed in a tubular member located in a radial bore in said body.

11. The flow meter of claim 10 wherein said optical fibers comprises a bundle of fibers conveying said light from said light source, and a single fiber conveying said reflected light to said photosensitive element.

* * * * *